(12) United States Patent
Patel

(10) Patent No.: US 7,596,381 B2
(45) Date of Patent: Sep. 29, 2009

(54) GENERATING A CODE MASK BASED ON GEOGRAPHICAL COORDINATE VALUES

(75) Inventor: Sarvar M. Patel, Montville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1153 days.

(21) Appl. No.: 10/641,526

(22) Filed: Aug. 15, 2003

(65) Prior Publication Data
US 2005/0037778 A1    Feb. 17, 2005

(51) Int. Cl.
*H04W 24/00* (2006.01)
(52) U.S. Cl. .............................. 455/456.1; 455/456.5
(58) Field of Classification Search ............ 455/456.1, 455/456.2, 456.5, 456.6, 457, 404.1, 404.2; 340/988, 989, 991, 992, 993, 995.24
See application file for complete search history.

(56) References Cited

U.S. PATENT DOCUMENTS

| | | | |
|---|---|---|---|
| 6,018,667 A | 1/2000 | Ghosh | 455/502 |
| 6,345,233 B1 * | 2/2002 | Erick | 701/301 |
| 6,473,619 B1 * | 10/2002 | Kong et al. | 455/456.1 |
| 7,184,744 B1 * | 2/2007 | Schnabel | 455/404.2 |
| 2002/0082017 A1 | 6/2002 | Hattori | 455/436 |
| 2003/0095520 A1 * | 5/2003 | Aalbers et al. | 370/338 |
| 2004/0063439 A1 * | 4/2004 | Glazko et al. | 455/455 |

OTHER PUBLICATIONS

Rajkotia et al. U.S. Appl. No. 60/478,588, Jun. 13, 2003.*
European Search Report dated Oct. 20, 2004 for European application No. EP 04 25 4507.
Higuchi, K. et al.: "Fast Cell Search Algorithm in DS-CDMA Mobile Radio Using Long Spreading Codes," Vehicular Technology Conference, 1997, IEEE 47th Phoenix, AZ, USA May 4-7, 1997, New York, NY, USA, IEEE, US May 4, 1997, pp. 1430-1434.

* cited by examiner

*Primary Examiner*—Jean A Gelin

(57) ABSTRACT

A method and apparatus are provided. The method comprises defining a geographical position of a base station by a first coordinate value and a second coordinate value; modifying the first coordinate value based on the second coordinate value; and generating an identifier based on at least the modified first coordinate value.

23 Claims, 8 Drawing Sheets

GENERATING A CODE MASK BASED ON GEOGRAPHICAL COORDINATE VALUES

BACKGROUND OF THE INVENTION

1. Field of the Invention

This invention relates generally to telecommunications, and, more particularly, to wireless communication systems.

2. Description of the Related Art

FIG. 1 illustrates a portion of a geographic area in which wireless services are provided by a first service provider having a first network of cells 10 and a second service provider having a second network of cells 20. Each of the cells in the first and second network of cells 10 and 20 represent a coverage area for a corresponding base station in the network run by the respective service provider. A base station generally provides wireless communication services for mobile stations 12 within its coverage area.

As will be appreciated, the communication between a base station and a mobile station 12 has great potential for interfering with the communication between another base station and another mobile station 12. This potential interference exists for base stations in the same network as well as between base stations in different networks. Also, communication between a single base station and two different mobile stations 12 has the potential for interfering with one another. To avoid this interference, wireless communication systems such as Code Division Multiple Access 2000 (CDMA 2000) wireless systems use codes to differentiate transmissions. As will be described below, base stations BSs use codes generated from different offset values to differentiate between transmissions by different base stations. Also, a base station BS uses codes to differentiate between different traffic channels assigned to mobile stations 12 by the base station BS.

In a CDMA 2000 system, each service provider assigns an identifier BS_ID to the base stations to uniquely identify each base station in the network. However, a base station identifier BS_ID does not necessarily uniquely identify base stations in different networks. When transmitting, a base station codes its transmission based on a different offset such as the pseudoNoise (PN) offset in CDMA 2000. In CDMA 2000, the PN offset is a 9-bit string that differentiates one base station BS from its neighboring base stations even when those base stations are in different networks. As illustrated in FIG. 1, base stations from different networks may be neighboring base stations. While FIG. 1 illustrates neighboring base stations as having coverage areas that are adjacent or near one another (e.g., separated by one or more cells), it will be understood that neighboring base stations may also have overlapping coverage areas. The mobile station 12 obtains the PN offset from the base station to decode the transmissions from the base station and differentiate the transmission of one base station from another base station. In CDMA 2000, for example, the mobile station 12 obtains the PN offset as well as the base station identifier BS_ID from a message broadcast by the base station over a forward control channel.

When a base station assigns a traffic channel over which the mobile station 12 may communicate, the base station uses codes to differentiate one traffic channel transmission from another traffic channel transmission. In CDMA 2000, a different Walsh code is used to code each traffic channel of a base station. As with the PN offset, the Walsh code assigned to a traffic channel between the base station and a mobile station 12 is communicated to the mobile station 12 in a message over a forward control channel. At the mobile station 12, the mobile station 12 decodes the transmission over the traffic channel and differentiates one traffic channel from another using the Walsh code.

Codes are also used to differentiate reverse link transmissions (mobile station to base station) over traffic channels. The code used by a mobile station to code and differentiate traffic channel transmissions is referred to as a code mask. In a CDMA 2000 system, the code mask is referred to as the long code mask, and two types of long code masks are known: private and public. In a CDMA 2000 system, the public long code mask (PLCM) is typically formed using the electronic serial number (ESN) of the mobile station 12. The PLCM in a CDMA 2000 system is 42-bits long; however, other long code mask sizes exist. Typically, the PLCM includes a plurality of bits for indicating the type of the long code mask (private or public), along with a 32-bit ESN of the mobile station 12. The 32-bit ESN is often considered the variable portion of the PLCM.

For the base station to decode the traffic channel transmission for the mobile station 12, the base station needs to obtain the mobile station's ESN, and numerous methods are known in the art for accomplishing this. As an alternative to the above-discussed PLCM generation method, a CDMA 2000 system also provides that the base station BS may assign a PLCM of its choosing to a mobile station 12 during a call activation (e.g., call origination or call delivery).

Owing to the large and growing number of mobile stations 12, the supply of 32-bit ESNs is being exhausted, and discussions have begun on transitioning from the use of 32-bit ESNs to 56-bit mobile equipment identifiers (MEIDs). The use of a 56-bit MEID poses several challenges in the context of generating public long code masks. Directly using a 56-bit MEID value (for a PLCM that is otherwise 42-bits long) would require hardware changes. Accordingly, several proposals exist for using the MEID to generate the public long code mask that does not require such hardware changes. One proposal is to map the 56-bit MEID to a 24-bit value, concatenate a fixed 8-bit value to the 24-bit mapped value and create a 32-bit pseudo-ESN. The pseudo-ESN could then be used as the ESN in the conventional public long code mask generation process.

However, it has been shown that this pseudo-ESN method does not result in a sufficient number of different public long code masks to prevent an undesirable number of collisions between mobile station communications. A collision occurs when the transmissions from two or more mobile stations 12 are not uniquely identifiable.

Other techniques have been proposed to resolve this collision problem, including one in which PLCMs are assigned based on the longitude and latitude value of the base station. In this base station-assigned PLCM proposal (hereinafter referred to as "BSAPLCM" proposal), all of the base stations use only one fixed format that supports all cell sizes, both large and small. In the BSAPLCM proposal, and as shown in FIG. 2, the PLCM is formed of 42-bits, where the first 3 bits are utilized to distinguish between private/public code masks and to differentiate between the MEID generated PLCM and BS-Assigned PLCM. The remaining 39 bits of the PLCM are associated with three different components or fields—latitude (11 bits), longitude (11 bits), and a mobile station ID (MS_ID) (17 bits). The "longitude" and the "latitude" fields respectively contain a longitudinal value and a latitudinal value that represent the position of the base station. These values are expressed in units of "x" seconds, and are converted to an 11-bit number. The conversion to an 11-bit number is described in greater detail below. The mobile server ID field is a 17-bit field that is assigned by the base station to uniquely identify the mobile units 12. The longitude, latitude, and mobile server ID fields collectively make up the remaining 39 bits of the PLCM.

The BSAPLCM proposal suggests that a given base station can be identified to a precision of substantially 0.25 seconds if 22-bit and 23-bit values are used to respectively represent the latitude and the longitude information associated with that base station. However, using a combined 44-bit value to represent the latitude and longitude information is not feasible because of the restriction imposed by the 42-bit long PLCM value. The proposal suggests using, for example, 11 bits to represent the latitude value and 11 bits to represent the longitude value of a base station, as shown in FIG. 2. The BSAPLCM proposal arrives at the 11-bit longitude and latitude values by right shifting the corresponding 23-bit longitude and 22-bit latitude values by 5 bits and then converting the remaining bits to 11 bits using a MOD operation.

Reducing the longitude and latitude fields from the respective 23 and 22 bits to 11 bits naturally results in a loss of resolution in terms of the precision by which a particular base station can be distinguished from another at a given location. For example, according to the BSAPLCM proposal, shifting the higher-bit values by 5 bits results in a 0.15 mile granularity. That is, the base stations located within 0.15 miles of each other will have identical 11-bit longitude and latitude values. Thus, the base stations within this range cannot be distinguished from each other. Furthermore, the proposal acknowledges that reducing the number of bits employed to represent the longitude and latitude values exacerbates this issue, as two stations located 314 miles apart will have the same 11-bit longitude and latitude values. The proposal refers to the distance at which the base stations may have the same 11-bit longitude and latitude values repeat as the "reusable distance" (e.g., the 314 miles in the example discussed above).

The BSAPLCM proposal suggests that problems of multiple base stations that are located in close proximity (e.g., 0.15 miles) to each other, and thus have the same 11-bit longitude and latitude value, can be alleviated by partitioning the mobile station IDs (see FIG. 2) among these base stations. Thus, even though a PLCM value may be calculated based on the same 11-bit longitude and latitude values associated with the two different base stations, the rationale is that the mobile station IDs will be unique to each user. This approach involves some manual intervention by the service provider.

The BSAPLCM proposal suffers from at least one shortcoming in that its calculations for the reusable distance (e.g., ~314 miles) are based upon conditions on or about the Earth's equator. That is, the proposal does not take into account the fact that the distance between longitudinal lines decrease as one moves away from the equator. As the distance between the longitudinal lines decrease, the reusable distance similarly decreases. A reduced reusable distance, however, is undesirable because the potential for collisions is greater. That is, as the reusable distance decreases, it becomes more likely that a mobile station 12 may obtain a PLCM in a first region and then travel the reusable distance to a second region where the same PLCM has been assigned to another mobile station 12. Accordingly, an improved way of generating PLCMs is desired to reduce the potential of collisions.

The present invention is directed to overcoming, or at least reducing, the effects of, one or more of the problems set forth above.

SUMMARY OF THE INVENTION

In one embodiment of the present invention, a method is provided. The method comprises defining a geographical position of a base station by a first coordinate value and a second coordinate value; modifying the first coordinate value based on the second coordinate value; and generating an identifier based on at least the modified first coordinate value.

In one embodiment of the present invention, an apparatus is provided for generating code masks that are associated with a base station that is definable by a latitudinal value and a longitudinal value. The apparatus comprises a storage unit having a plurality of code masks stored therein, wherein the code masks are generated by modifying the longitudinal value based on the latitudinal value. The apparatus further comprises a control unit communicatively coupled to the storage unit, the control unit adapted to assign at least one of the plurality of stored code masks to a mobile unit in response to detecting a call activation.

In one embodiment of the present invention, a system is provided. The system includes a mobile unit and a base station that is definable by a latitudinal value and a longitudinal value. The base station includes access to a plurality of code masks, wherein the code masks are generated by modifying the longitudinal value based on the latitudinal value, and wherein the base station is adapted to assign at least one of the plurality of the code masks to the mobile unit in response to detecting a call activation.

In one embodiment of the present invention, a method is provided. The method includes receiving a code mask associated with a base station that is definable by a latitudinal value and a longitudinal value, wherein the received code mask is generated by modifying the longitudinal value based on the latitudinal value. The method further comprises coding information using the received code mask.

BRIEF DESCRIPTION OF THE DRAWINGS

The invention may be understood by reference to the following description taken in conjunction with the accompanying drawings, in which like reference numerals identify like elements, and in which.

Figure 1:
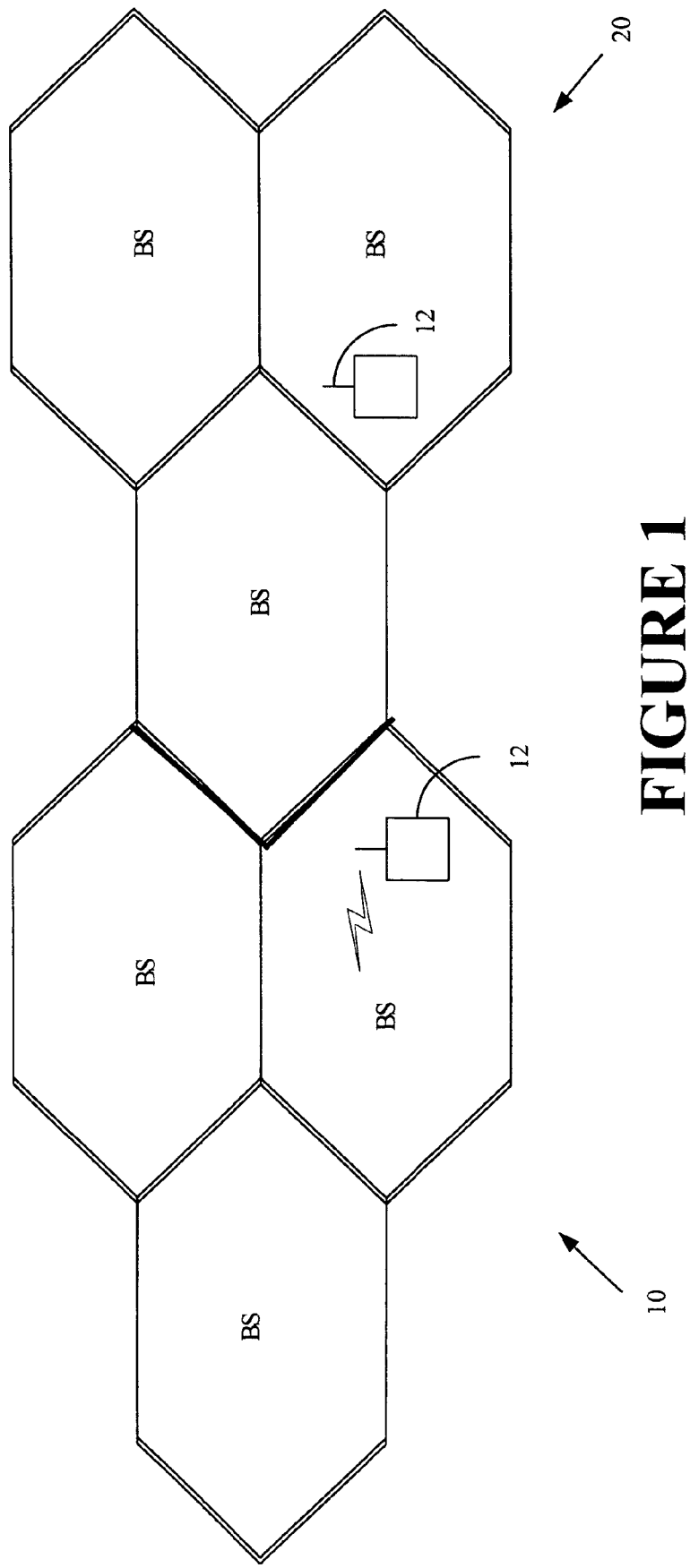
FIG. 1 illustrates a portion of a geographic area in which wireless services are provided by a first service provider having a first network of cells and a second service provider having a second network of cells.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
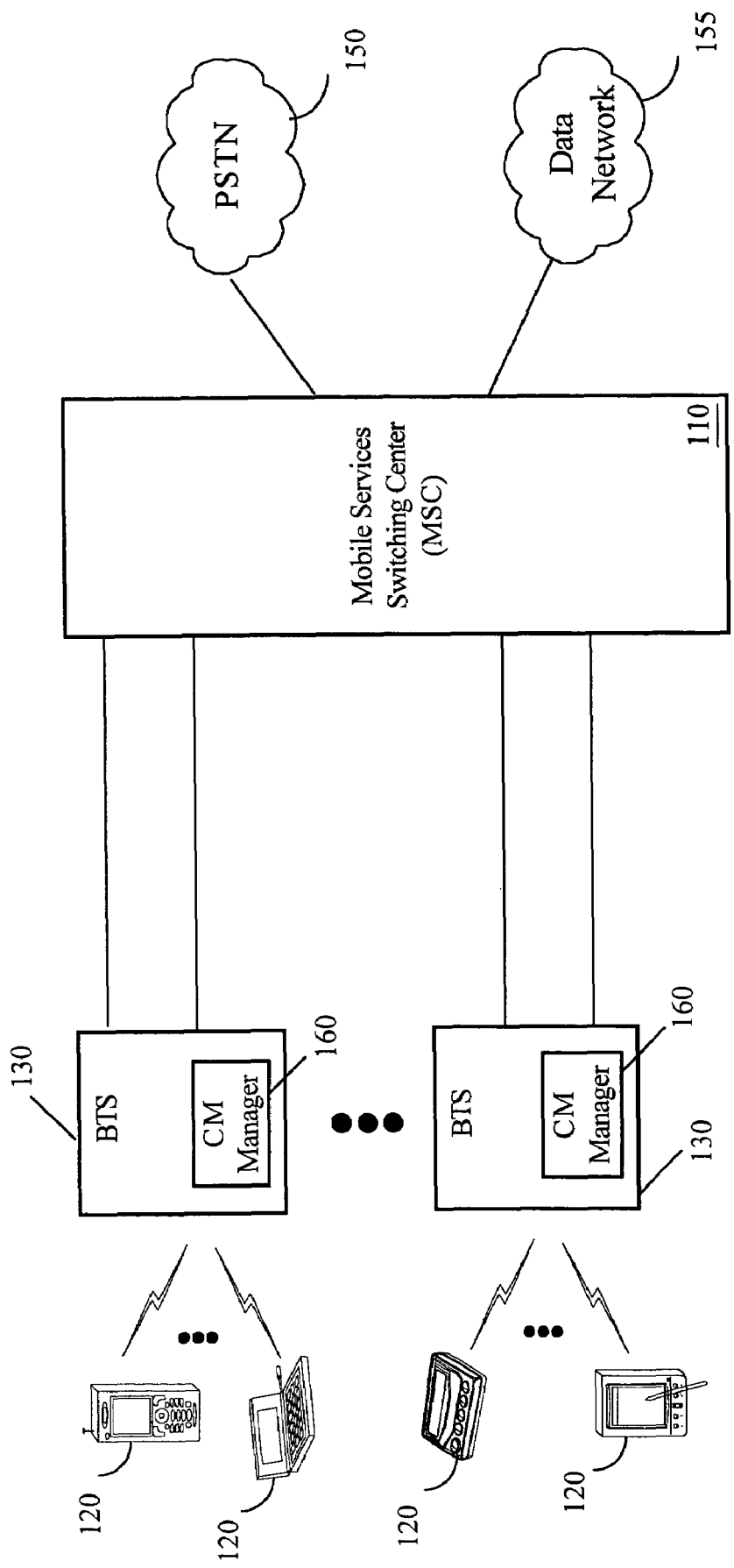
FIG. 3 depicts a block diagram of a communications system having one or more mobile units and base stations, in accordance with one embodiment of the present invention.

Turning now to the drawings, and specifically referring to FIG. 3, a communications system 100 is illustrated, in accordance with one embodiment of the present invention. For illustrative purposes, the communications system 100 of FIG. 1 is a Code Division Multiple Access (CDMA) system, although it should be understood that the present invention may be applicable to other systems that support voice and/or data communication. A CDMA system is a "spread spectrum" technology, allowing many users to occupy the same time and frequency allocations in a given band/space. As its name implies, a CDMA system assigns unique codes to each communication to differentiate it from others in the same spectrum. A CDMA system includes second generation (2G) and third generation (3G) services. 2G CDMA standards are commonly known as CDMAONE and include the IS-95A and IS-95B standards. Two dominant standards for 3G services include CDMA2000 and wideband CDMA (CDMA2000 represents a family of technologies that includes CDMA2000-1X and CDMA2000-1xEV).

The communications system 100 of FIG. 1 includes a mobile services switching center (MSC) 110 that allows one or more mobile units 120 to communicate with a Public Switched Telephone Network (PSTN) 150 and/or a data network 155, such as the Internet, through one or more base stations (BTS) 130. The mobile services switching center 110 of FIG. 1 generally provides replication, communications, runtime, and system management services. The mobile services switching center 110 may also handle call processing functions, such as setting and terminating a call path. The mobile unit 120 may include one of a variety of devices, including cellular phones, personal digital assistants (PDAs), laptops, digital pagers, wireless cards, and any other device capable of accessing the networks 150, 155.

In the communications system 100 of FIG. 1, the plurality of base stations 130 may be distributed within an area to be serviced by the system 100. Various users within the area, fixed or mobile, may then access the system 100 and, thus, other interconnected telecommunications systems, via one or more of the base stations 130. Typically, a mobile user maintains communications with the system 100 as he/she passes through an area by communicating with one and then another base station 130, as he/she moves. The user may communicate with the closest base station 130, the base station 130 with the strongest signal, the base station 130 with a capacity sufficient to accept communications, etc.

The base stations 130, in the illustrated embodiment, include a code mask (CM) manager 160 that, as described in greater detail below, manages (e.g., creates, assigns, tracks) code masks. In the illustrated embodiment, the code mask manager 160 specifically manages public long code masks (PLCMs). The code mask manager 160 may be implemented in software, hardware, or a combination thereof.

In accordance with one or more embodiments of the present invention, an improved scheme is provided for determining and assigning PLCMs to facilitate communications with the mobile units 120 in a manner that reduces the potential for collisions. Although not so limited, for the purposes of this discussion, the PLCMs are generated in accordance with the format shown in FIG. 2. In one embodiment, the CM manager 160, in calculating a PLCM, takes into account the fact that the distance between the longitude lines decrease as one moves away from the equator. As described in greater detail below, in one embodiment, the PLCMs are generated by adjusting a value associated with the longitude of a base station 130 based on the latitude of that base station 130. In this manner, the potential for collisions is reduced. The latitudinal value and the longitudinal value associated with a base station 130 can be calculated in one of a variety of well-known techniques known in the art, and, as such, are not described in detail herein.

The communications system 100 also allows for soft and hard handovers. In instances when users change between different service networks, a hard handoff is required. In accordance with one embodiment of the present invention, a mobile unit 120 is assigned a new PLCM on a hard handoff, where the new PLCM will be based on the coordinates of the target base station 130. Assigning a new PLCM to the mobile station 120 on a hard handoff reduces the potential for collisions.

It should be understood that the configuration of the communications system 100 of FIG. 1 is exemplary in nature, and that fewer, additional, or different components may be employed in other embodiments of the communications system 100 without deviating from the spirit and scope of the invention. For example, one or more routers (not shown) may be interspersed between the MSC 110 and the bases stations 130. As an additional example, the communications system 100 may include an Authentication, Authorization, and Accounting (AAA) server (not shown). Yet as another example, some or all portions of the CM manager 160 may be implemented in the MSC 110. Similarly, other modifications may be made to the communications system 100 consistent with the spirit and scope of the present invention.

Figure 4:
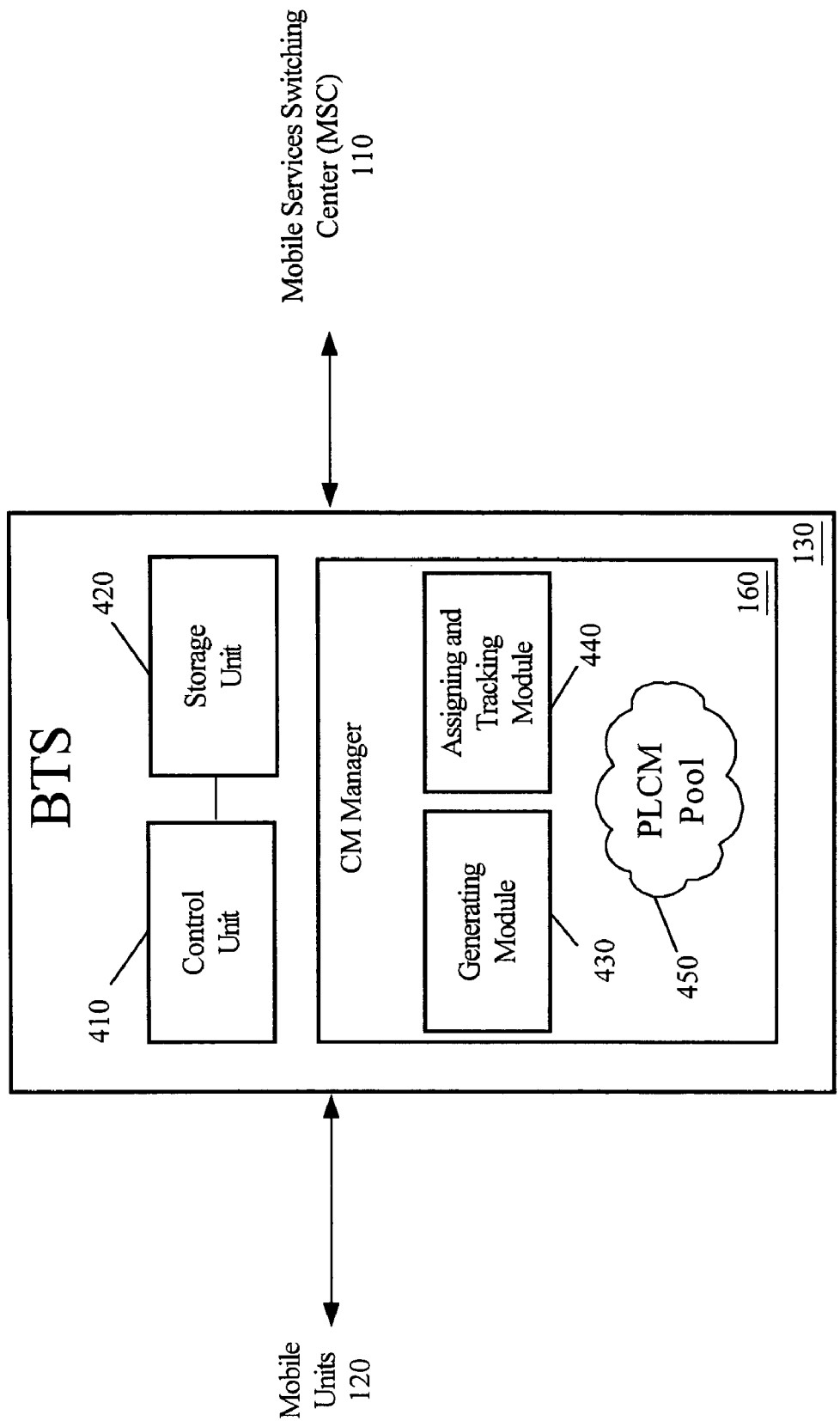
FIG. 4 depicts a block diagram of a base station that may be employed in the communications system of FIG. 3, in accordance with one embodiment of the present invention.

Referring now to FIG. 4, a block diagram of one embodiment of the base station 130 is illustrated. The base station 130 includes a control unit 410 that is communicatively coupled to a storage unit 420 and is capable of executing one or more software instructions stored in the form of a program in the storage unit 420. The base station 130 includes the CM manager 160, which in the illustrated embodiment is implemented in software and is storable in the storage unit 420. The CM manager 160 includes a generating module 140 and an assigning and tracking module 440.

Figure 5:
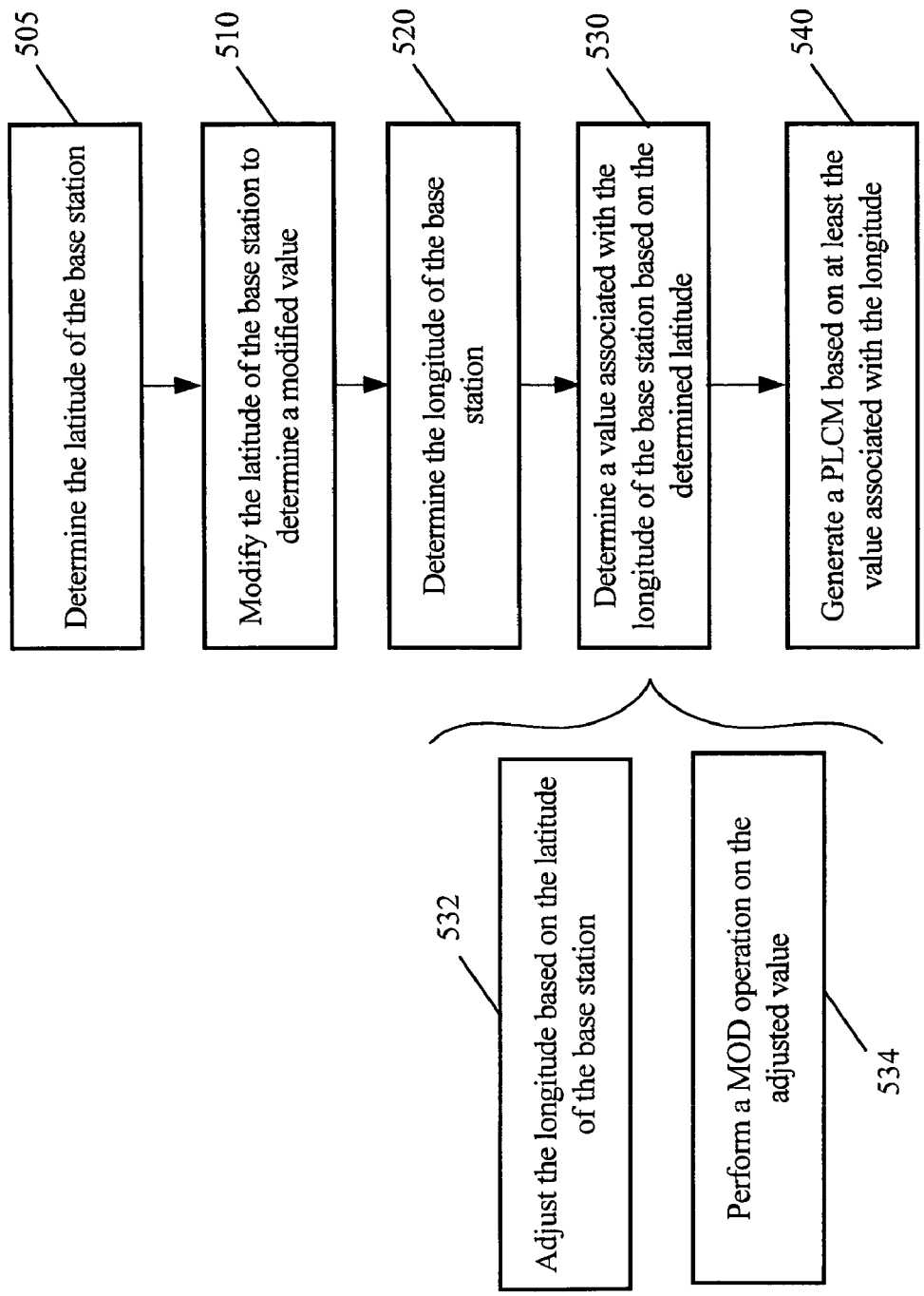
FIG. 5 depicts a flow diagram of a method for determining a PLCM for communications between a mobile unit and the base station of the communications system of FIG. 3, in accordance with one embodiment of the present invention.

The generating module 430, described in greater detail in FIG. 5, generally calculates the desired PLCMs for communications with the mobile unit 120. In the illustrated embodiment, because the base station 130 includes the generating module 430, the base station 130 is capable of generating PLCMs on an as-needed basis. However, in an alternative embodiment, instead of creating PLCMs dynamically, a pool 450 of PLCMs may be created in advance and pre-stored in the base station 130 for subsequent use. The pre-stored PLCMs may be created using the same scheme (described below) that is employed by the generating module 430 to generate the PLCMs. In one embodiment, the PLCMs in the pool 450 can be reusable. That is, when a call is released, the base station 130 that originally assigned the PLCM to the mobile unit 120 can release that PLCM (into the pool 450) so that it is available for reuse. Thus, in instances where the PLCMs are pre-created and stored in the base station 130, the generating module 430 may not be needed. The present invention contemplates the notion of dynamically creating PLCMs, creating and storing the PLCMs in advance of the use, or a combination of both where some portion of the PLCMs is pre-stored while the other portion is dynamically created.

The assigning and tracking module 440 of the base station 130 determines which PLCMs are available from the pool 450 and assigns one of the available PLCMs to a mobile unit 120 desiring to establish a connection. The assigning and tracking module 440 thus tracks the PLCMs that are in use, and can determine which PLCMs are available for use. In the illustrated communications system 100 of FIG. 1, when the base station 130 that originally assigned the PLCM to a mobile unit 120 is notified that the call has terminated, the module 140 of that base station 130 releases the assigned PLCM into the pool 450 for reuse. In one embodiment, the base station 130 that originates the PLCM may be notified of the call termination even if that base station 130 is not the one handling the call at the time of termination (i.e., because there was a soft or a hard handover). In case of a soft or hard handover, the base station 130 handling the call termination can notify the originating base station 130 that the call has terminated and that the assigned PLCM can be freed for future use. In one embodiment, the notification to the originating base station 130 may be transmitted through one or more intervening MSCs 110.

Referring now to FIG. 5, a flow diagram of the generating module 430 of the base station 130 of FIG. 4 is illustrated, in accordance with one embodiment of the present invention. For ease of illustration, the process of generating PLCMs is described in the context of a single base station 130, although it should be appreciated that each generating module 430 generates the PLCMs for its corresponding base station 130 based on the geographical position or location of that base station 130. Alternatively, as discussed above, the PLCMs may be generated elsewhere and then stored in the corresponding base stations 130. For the purposes of this discussion, it is assumed that each base station 130 has a corresponding generating module 430.

As shown in FIG. 5, the generating module 430 determines (at 505) the latitude associated with the base station 130. This latitude may be represented using, for example, a 22-bit value, and may be expressed in "x" seconds. In one embodiment, the latitude may be pre-stored in the base station 130, and, as such, the act of determining (at 505) the latitude may comprise retrieving the stored value. In the illustrated embodiment, it is assumed that the latitude is represented using a 22-bit value, although in other embodiments, a higher-bit or a lower-bit value may be used. The generating module 430 modifies (at 510) the latitude of the base station 130 to arrive at a different value (herein termed as a "modified latitude value). In one embodiment, this modified latitude value may be a lower-precision representation of the latitude that is determined at block 505. For example, the modified latitude value may be determined by shifting the 22-bit value of the latitude of the base station 130 by a preselected amount and then performing a MOD function. In one embodiment, the modified latitude value may be determined by shifting the 22-bit latitude value to the right by 5 bits to arrive at a 17-bit value. A MOD operation may then be performed on the 17-bit value to convert it to a lower-bit value, such as an 11-bit value, for example. As noted above, because generating module 430 employs the PLCM format of FIG. 2 for the purposes of this discussion, it is herein assumed that it is desirable to reduce the latitude of the base station 130 to 11 bits, although it should be appreciated that in alternative embodiments other lengths may be utilized.

The generating module 430 determines (at 520) the longitude of the base station 130. This longitudinal value may be represented using, for example, a 23-bit value, and may be expressed in "y" seconds. In one embodiment, the longitude may be pre-stored in the base station, and, as such, the act of determining (at 505) the longitude may comprise retrieving the stored value. The generating module 430 determines (at 530) a value associated with the determined longitude based on the latitude of the base station 130. In one embodiment, the value associated with the longitude may be determined (at 530) by adjusting (at 532) the full 23-bit value of the longitude of the base station 130 by a preselected amount, wherein the preselected amount is determined by the latitude of the base station 130. The manner in which the longitudinal value of the base station 130 may be adjusted (at 532) is better understood with reference to FIG. 6.

Figure 6:
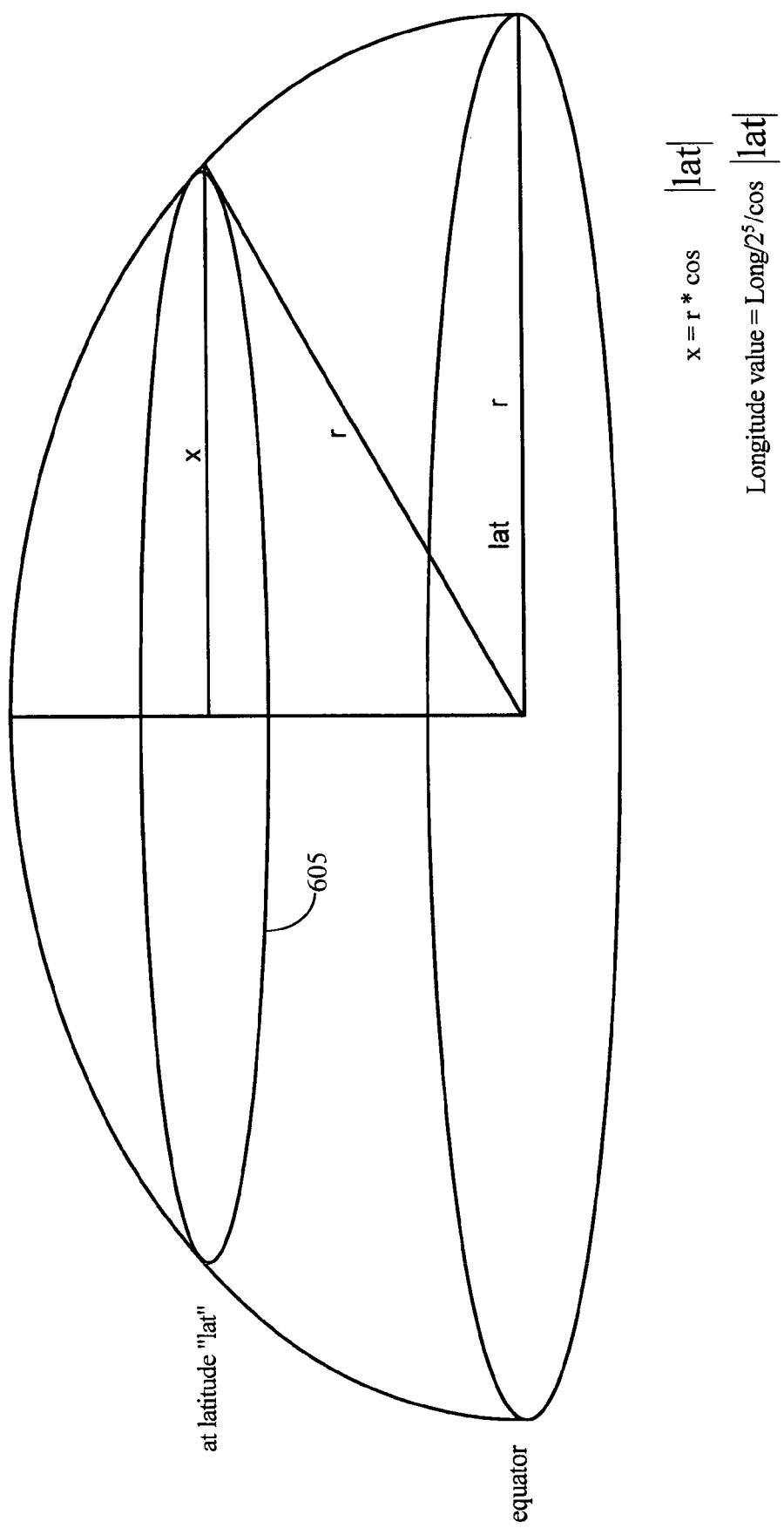
FIG. 6 depicts a graphical illustration for determining a longitudinal value based on a corresponding latitudinal value to determine the PLCM, in accordance with one embodiment of the present invention.

As noted previously, because the distance between the longitude lines decrease as one moves away from the equator, the reusable distance similarly decreases. A reduced reusable distance, however, is undesirable because the potential for collisions is greater. FIG. 6 illustrates a manner by which the reusable distance at a given latitude is maintained (i.e., ~314 miles reusable distance and ~0.15 miles of granularity), even as one moves away from the equator. This is accomplished, as shown in FIG. 6, by adjusting the longitudinal value of the base station 130 based on the latitude of that base station 130.

FIG. 6, which is a stylistic representation of Earth's northern hemisphere, illustrates that the radius of a circle 605 at a given latitude, "lat," can be expressed as "R×cos|lat|," where R is the radius of the circle at the equator. Thus, based on FIG. 6, it can be seen that there is a shrinkage in the radius of circle 605 by a factor of about "cos|lat|" relative to that of the equator. To compensate for this shrinkage, in accordance with one embodiment of the present invention, and to maintain at least the same level of resolution as that present at the equator, the longitudinal value of the base station 130 is adjusted by the "cos|lat| factor. Thus, instead of shifting the longitudinal value by five (5), as suggested by the proposal, in the illustrated embodiment, the longitudinal value is adjusted by a value based on the latitude of the base station 130. For example, to achieve a resolution of 0.15 miles on the circle 605, the longitudinal value may be calculated using the following expression Floor(longitude/($2^5$/cos|lat|)), where the Floor function refers to rounding to the nearest, lower integer (or, put another way, using the quotient while discarding the remainder).

In the example shown in FIG. 6, the circle 605 is at 60 degrees latitude. Thus, at a latitude of 60 degrees, the expression "cos|60|" is 0.5, and the expression "$2^5$/cos|60|" is substantially equivalent to "$2^6$." Accordingly, at a latitude of 60 degrees, the longitudinal value is adjusted as follows: Floor (longitude/$2^6$) (i.e., the longitude value is divided $2^6$, and the Floor function is applied thereafter to obtain the result). By dividing the longitudinal by $2^6$ (at a latitude of 60 degrees), the resolution remains 0.15 miles even away from the equator, and that the reusable distance also remains the same as that at the equator. Similarly, the longitudinal values may be calculated for other latitudes using the expression: Floor(longitude/($2^5$/cos|lat|)). Thus, by adjusting the longitude of the base station 130 based on the latitude of the base station 130, it is possible to achieve at least the same resolution as that available on the equator under the BSAPLCM proposal. For clarity and to avoid unnecessarily obscuring the invention, the conversions from degrees to minutes/seconds, and vice-versa, has been omitted, as one skilled in the art having the benefit of this disclosure can perform these desired conversions.

Referring again to FIG. 5, the act of determining the value associated with the longitude of the base station 130 (at 530) may further include performing a MOD operation (at 534) on the adjusted (at 532) longitude value. In one embodiment, like the value associated with the latitude of the base station 130, the value associated with the longitude of the base station is converted to an 11-bit value.

Figure 2:
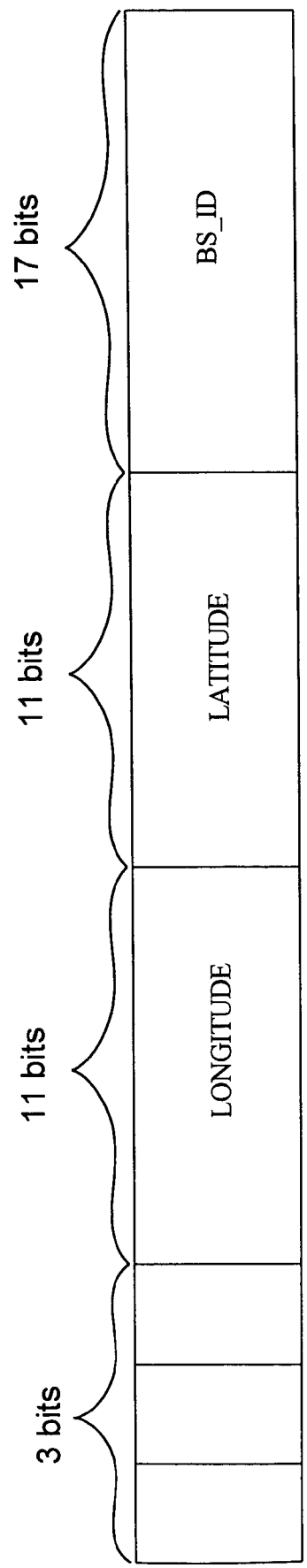
FIG. 2 illustrates an exemplary format of a public long code mask.

Based on at least the value associated with the longitude that is determined (at 530), the generating module 430 generates (at 540) a PLCM in accordance with the format shown in FIG. 2. In one embodiment, the determined longitudinal value (at 530) is concatenated with the determined latitude value (at 510). The concatenation of just these values means that the reusable distance will be at least ~314 miles independent of the latitude. To complete the 42-bit PLCM, the MS ID, as well as the first three bits, is also concatenated in the manner shown in FIG. 2. The leading 3 bits indicate that this is a BS assigned PLCM (e.g., as opposed to a MEID based PLCM). The MS_ID in the illustrated embodiment is a 17-bit value, although it can vary from one implementation to another. The base station 130 utilizes the MS_ID to uniquely identify the mobile units 120 that it is servicing (that is, while each mobile unit 120 communicating with a common base station 130 will have the same latitude and longitude values as part of the PLCM that is assigned to that mobile unit 120, the MS_ID portion of the PLCM will be different for each of these mobile units 120. Thus, for at least a given cell, each mobile unit 120 is assigned a unique identifier. In one embodiment, the MS_IDs may be uniquely partitioned among the base stations 130 sharing the same 11-bit latitudinal and longitudinal value.

Figure 7:
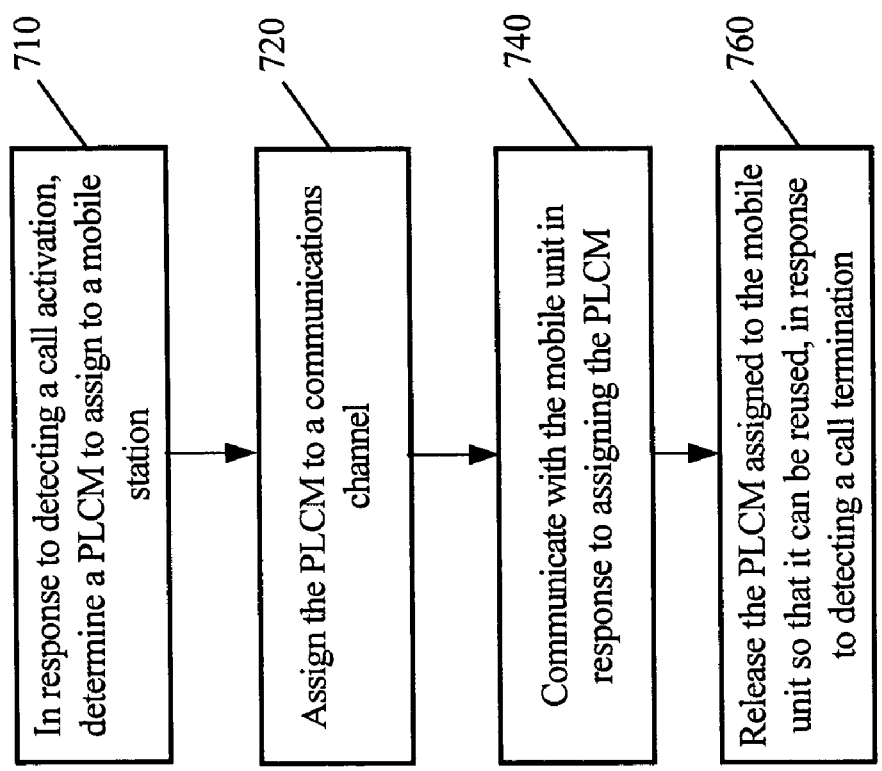
FIG. 7 illustrates a flow diagram of a method of assigning the determined PLCM value of FIG. 5 for communications between the mobile unit and base station of the communications system of FIG. 3.

It should be appreciated that the format shown in FIG. 2 is exemplary in nature and that any other manner of combining the longitudinal and the latitudinal values may also be utilized without deviating from the spirit and scope of the invention. The generated PLCM can thereafter be assigned to a mobile unit 120 desiring to establish a connection with the base station 130, as described below. Referring now to FIG. 7, a flow diagram of the assigning and tracking module 440 of the base station 130 of FIG. 4 is illustrated, in accordance with one embodiment of the present invention. Once a call activation is detected by the base station 130, the assigning and tracking module 440 determines (at 710) a PLCM to assign to a mobile unit 120 desiring to communicate with the base station 130. In one embodiment, the PLCM that is to be assigned to the mobile unit 120 may be one that is generated (at 540—see FIG. 5) by the generating module 430. In an alternative embodiment, the assigning and tracking module 440 may determine (at 710) a PLCM to assign from the PLCM pool 450 (see FIG. 4) of available PLCMs that are generated in accordance with the method described in FIG. 5. In one embodiment, the assigning and tracking module 440 of the base station 130 can use the MS_IDs to track which PLCMs are available and which are in use from the pool 450 (see FIG. 3) of PLCMs.

At block 720, the base station 130 assigns the PLCM (determined at block 710) to the mobile unit 120. Assigning the PLCM to the mobile unit 120 may include informing the mobile station 120 of that PLCM. This can be accomplished in one of several ways. In one embodiment, the PLCM may be transmitted over a suitable communications channel to mobile unit 120, which then codes the transmission using the PLCM, and the base station 130 thereafter decodes the transmission using the PLCM. In an alternative embodiment, if the latitude and longitude of the base station 130, along with the MS ID, are accessible to the mobile unit 120, the mobile unit 120 itself can, using the method described in FIG. 5, calculate the PLCM. Thus, in this embodiment, the base station 130 may not need to transmit the PLCM to the mobile unit 120.

Upon assigning the PLCM (at 720), the base station 130 may communicate with the mobile unit 120. That is, the base station 130 may decode (at 740) the information transmitted over a communications channel, such as a traffic channel, using the PLCM. And, once the call is terminated, the assigning and tracking module 440 releases (at 760) the PLCM assigned to the mobile unit 120 so that it can be later reused for another call.

Figure 8:
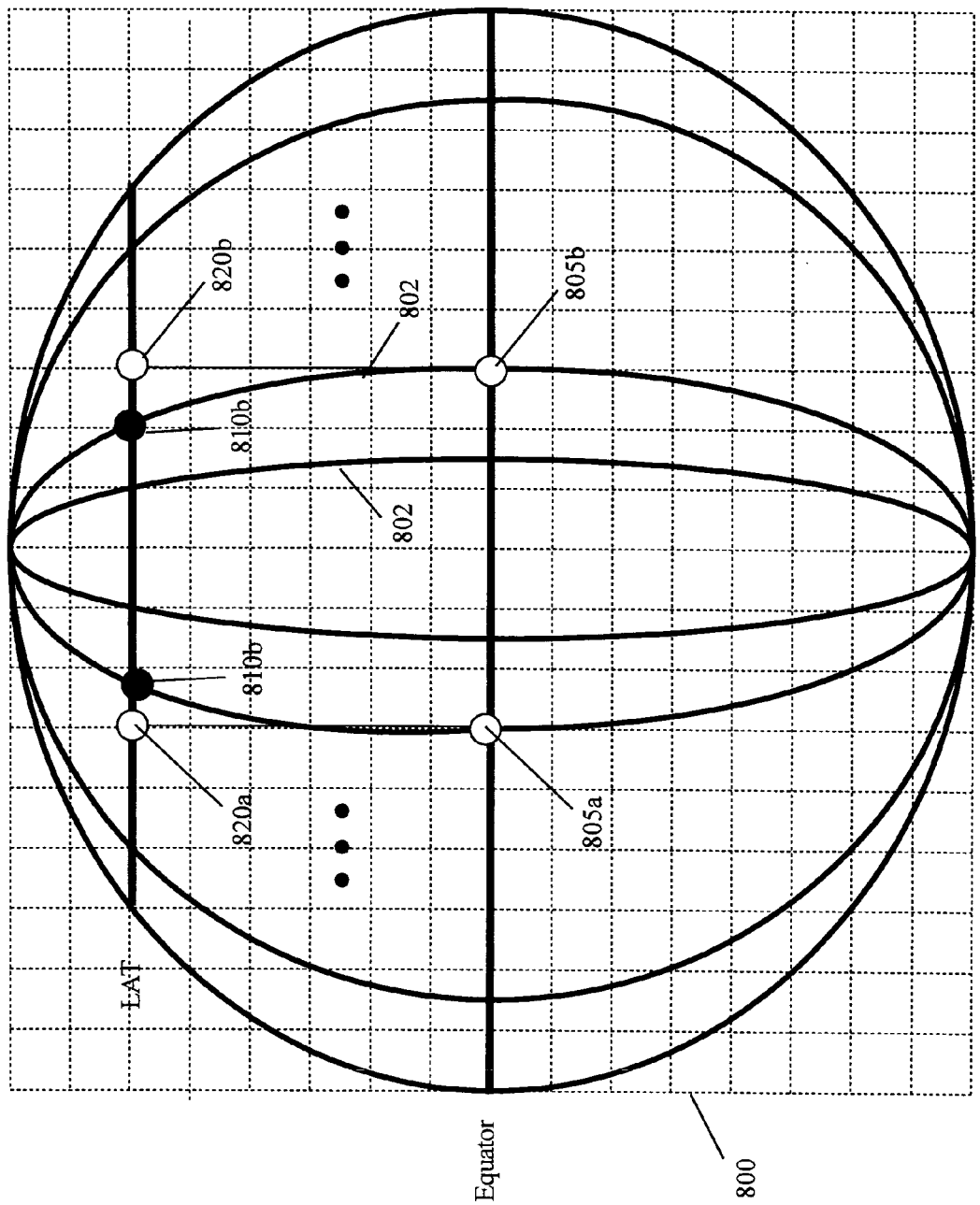
FIG. 8 is a stylized depiction of a portion of the Earth's surface illustrating a benefit gained by at least one embodiment of the present invention.

FIG. 8 is a stylistic illustration of a portion of the Earth with one or more longitudinal lines 802 superimposed therein. FIG. 8 is provided to graphically depict the shortcoming of the BSAPLCM proposal, as well as to illustrate the improvement provided by one or more embodiments of the described invention. It should be understood that FIG. 8 is not necessarily drawn to scale. A square grid 800 has been superimposed on the Earth's surface in FIG. 8 for the benefit of the reader. In FIG. 8, a first exemplary point 805a and a second exemplary point 805b are utilized to represent the "reusable distance" (i.e., the distance after which the 11-bit longitudinal and latitudinal values may repeat). Under the BSAPLCM proposal, the "reusable distance" at latitude, LAT, decreases to a distance between the points 810a and 810b. With this reduced reusable distance, the potential for collisions is greater for reasons explained above. In contrast, with the advent of the claimed invention, the reusable distance at latitude, LAT, remains constant (as represented by the grid 800) relative to that provided by the BSAPLCM proposal with respect to the equator. By adjusting the longitude of the base station 130 based on the latitude value of the base station 130, the reusable distance is maintained, as shown by points 820a and 820b, thereby reducing the likelihood of collisions.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units (such as the control unit 410 (see FIG. 4)). The control unit 410 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 410 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method, the method comprising:
defining a geographical position of a base station by at least a first coordinate value and a second coordinate value;
modifying the first coordinate value based on the second coordinate value; and
generating an identifier based on at least the modified first coordinate value;
wherein the first coordinate value is a longitudinal value of the base station and the second coordinate value is a latitudinal value of the base station, and wherein modifying comprises modifying the longitudinal value by a factor of "cosine of |latitude|," where the "latitude" is the latitudinal value associated with the base station; and
wherein generating, using a communication device, the identifier comprises generating a code mask.

2. The method of claim 1, further comprising providing the code mask to a mobile unit in response to detecting a call activation.

3. The method of claim 1, wherein generating the code mask comprises combining at least a portion of the latitudinal value, the modified longitudinal value, and an unique identification value.

4. The method of claim 1, wherein the identification value is transmitted to a mobile unit and wherein the mobile unit calculates the code mask based on at least a portion of the latitudinal value, the modified longitudinal value, and the unique identification value.

5. The method of claim 1, wherein the longitudinal value is represented by a first preselected number of bits and wherein the modified longitudinal value is represented by a second preselected number of bits, and wherein modifying the longitudinal value comprises applying a Floor function on the modified longitudinal value and thereafter applying a MOD function.

6. The method of claim 2, further comprising detecting a call termination and releasing the assigned code mask for subsequent reuse.

7. The method of claim 2, further comprising receiving a call termination indication from a target base station and releasing the assigned code mask for subsequent reuse in response to receiving the call termination indication.

8. The method of claim 2, further comprising:
generating a plurality of code masks based on at least a portion of the latitudinal value, the modified longitudinal value, and an unique identification value;
storing the plurality of code masks in a storage unit;
identifying at least one unassigned plurality of the code masks; and
providing the identified code mask to the mobile unit.

9. A method, comprising:
determining a latitudinal value and a longitudinal value associated with a base station;
modifying the longitudinal value by a factor of "cosine of |latitude|," where the "latitude" is the latitudinal value associated with the base station; and
generating, using a communication device, a code mask based on at least the modified longitudinal value.

10. The method of claim 9, wherein generating the code mask comprises combining at least a portion of the latitudinal value, the modified longitudinal value, and the unique identification value.

11. The method of claim 10, further comprising assigning the code mask to a mobile unit and decoding transmissions received from the mobile unit over a traffic channel using the code mask.

12. The method of claim 9, wherein determining the latitudinal value and the longitudinal value comprises retrieving pre-stored respective values, which are not constrained as to the respective numbers of bits that represent said values.

13. An apparatus for generating code masks that are associated with a base station that is definable by a latitudinal value and a longitudinal value, comprising:
a storage unit having a plurality of code masks stored therein, wherein the code masks are generated by modifying the longitudinal value by a factor of "cosine of |latitude|," where the "latitude" is the latitudinal value associated with the base station; and
a control unit communicatively coupled to the storage unit, the control unit adapted to assign at least one of the plurality of stored code masks to a mobile unit in response to detecting a call activation.

14. The apparatus of claim 13, wherein modifying the longitudinal value comprises applying a Floor function on the modified longitudinal value and thereafter applying a MOD function.

15. The apparatus of claim 14, wherein the control unit is adapted to transmit the at least one of the plurality of stored code masks to the mobile unit and further adapted to decode transmissions from the mobile unit using the at least one transmitted code mask.

16. A system, comprising:
a mobile unit; and
a base station that is definable based on a latitudinal value and a longitudinal value, the base station having access to a plurality of code masks, wherein the code masks are generated by modifying the longitudinal value by a factor of "cosine |latitude|," where the "latitude" is the latitudinal value associated with the base station, wherein the base station is adapted to assign at least one of the plurality of the code masks to the mobile unit in response to detecting a call activation.

17. The system of claim 16, wherein the system is a CDMA system, and wherein the base station is adapted to transmit the at least one of the plurality of the code masks to the mobile unit and further adapted to decode transmissions from the mobile unit using the at least one transmitted code mask.

18. A method, comprising:
  receiving a code mask associated with a base station that is definable by a latitudinal value and a longitudinal value, wherein the received code mask is generated by modifying the longitudinal value by a factor of "cosine of |latitude|," where the "latitude" is the latitudinal value associated with the base station; and
  coding, using a communication device, information using the received code mask.

19. The method of claim 18, wherein receiving the code mask comprises receiving the code mask based on at least a portion of the latitudinal value, the modified longitudinal value, and the unique identification value.

20. The method of claim 18, further comprising transmitting the coded information to the base station.

21. The method of claim 18, further transmitting a call termination indication to the base station.

22. The method of claim 18, wherein receiving the code mask comprises receiving a 42-bit value.

23. An apparatus, comprising:
  means for defining a geographical position of a base station by a first coordinate value and a second coordinate value;
  means for modifying the first coordinate value based on the second coordinate value; and
  means for generating a code mask based on at least the modified first coordinate value;
  wherein the first coordinate value is a longitudinal value of the base station and the second coordinate value is a latitudinal value of the base station, and wherein modifying comprises modifying the longitudinal value by a factor of "cosine of |latitude|, " where the "latitude" is the latitudinal value associated with the base station.

* * * * *

UNITED STATES PATENT AND TRADEMARK OFFICE
CERTIFICATE OF CORRECTION

PATENT NO. : 7,596,381 B2  Page 1 of 1
APPLICATION NO. : 10/641526
DATED : September 29, 2009
INVENTOR(S) : Sarvar M. Patel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1808 days.

Signed and Sealed this

Twenty-eighth Day of September, 2010

David J. Kappos
*Director of the United States Patent and Trademark Office*